US011171581B2

(12) United States Patent
Swaaley (10) Patent No.: US 11,171,581 B2
(45) Date of Patent: Nov. 9, 2021

(54) METHODS AND DEVICES FOR UNIVERSAL BRAKING, SAFE START PROTECTION, AND OTHER MOTOR CONTROL FOR ALTERNATING CURRENT DEVICES

(71) Applicant: Scott J. Swaaley, San Diego, CA (US)

(72) Inventor: Scott J. Swaaley, San Diego, CA (US)

(*) Notice: Subject to any disclaimer, the term of this patent is extended or adjusted under 35 U.S.C. 154(b) by 0 days.

(21) Appl. No.: 16/877,310

(22) Filed: May 18, 2020

(65) Prior Publication Data

US 2020/0280270 A1 Sep. 3, 2020

Related U.S. Application Data

(63) Continuation of application No. 15/972,131, filed on May 5, 2018, now Pat. No. 10,658,953.

(60) Provisional application No. 62/503,096, filed on May 8, 2017.

(51) Int. Cl.
*H02P 23/20* (2016.01)
*H02P 3/24* (2006.01)
*H02P 1/44* (2006.01)
*B23Q 11/00* (2006.01)

(52) U.S. Cl.
CPC ............... *H02P 3/24* (2013.01); *H02P 1/445* (2013.01); *H02P 23/20* (2016.02); *B23Q 11/0092* (2013.01); *H02P 2207/01* (2013.01)

(58) Field of Classification Search
CPC .. H02P 3/24; H02P 1/445; H02P 23/20; H02P 2207/01; B23Q 11/0092
See application file for complete search history.

(56) References Cited

U.S. PATENT DOCUMENTS

| 2,818,539 | A | 12/1957 | Johnson |
| 2,922,097 | A | 1/1960 | Choudhury |
| 3,703,654 | A | 11/1972 | Karubian |
| 3,798,523 | A | 3/1974 | Gross |
| 4,258,368 | A | 3/1981 | Arnold et al. |
| 4,450,397 | A | 5/1984 | Painter et al. |
| 4,466,040 | A | 8/1984 | Barthel et al. |
| 4,820,964 | A | 4/1989 | Kadah et al. |
| 4,853,821 | A | 8/1989 | Lewis |
| 5,889,922 | A | * | 3/1999 | Bufe ................. B25B 21/02 318/245 |
| 5,962,935 | A | 10/1999 | Geisert |
| 6,208,042 | B1 | 3/2001 | Solis |

(Continued)

OTHER PUBLICATIONS

Office Action for U.S. Appl. No. 15/972,131, Swaaley, "Methods and Devices for Universal Braking, Safe Start Protection, and Other Motor Control for Alternating Current Devices", 8 pages.

*Primary Examiner* — Rina I Duda
(74) *Attorney, Agent, or Firm* — Lee & Hayes, P.C.

(57) ABSTRACT

A circuit for a smart safety system includes an electrical input connection to obtain power from a power source and an electrical output connection to regulate the power to an AC motor. The circuit also includes an adjustable DC power supply. One or more electronic switching devices regulate electricity output to the AC motor. The circuit has one more functional states including: a first state, activated via a first electrical signal, in which electricity is supplied to AC motor to allow normal operation of the AC motor, and a second state, activated via a second electrical signal, in which no electricity is supplied to the AC motor to prevent unintentional operation of the AC motor.

20 Claims, 4 Drawing Sheets

(56) References Cited

U.S. PATENT DOCUMENTS

| | | | |
|---|---|---|---|
| 6,587,325 B1 | 7/2003 | Volz | |
| 6,759,822 B2 | 7/2004 | Marusarz | |
| 7,075,195 B2* | 7/2006 | Feil | H02H 11/00 |
| | | | 307/142 |
| 7,112,900 B2 | 9/2006 | Brotto | |
| 7,211,972 B2* | 5/2007 | Garcia | B23Q 11/0092 |
| | | | 318/16 |
| 7,391,134 B2 | 6/2008 | Feil | |
| 7,420,341 B2* | 9/2008 | Glasgow | B05C 17/00503 |
| | | | 222/251 |
| 7,423,854 B2 | 9/2008 | Gandolfi et al. | |
| 8,061,245 B2* | 11/2011 | Gass | B23D 55/08 |
| | | | 83/58 |
| 8,336,432 B1* | 12/2012 | Butler | B23Q 11/0891 |
| | | | 83/58 |
| 8,446,120 B2* | 5/2013 | Forster | H01R 12/718 |
| | | | 318/503 |
| 2006/0225551 A1* | 10/2006 | Gass | B27B 5/38 |
| | | | 83/76.8 |
| 2006/0244408 A1 | 11/2006 | Feil | |
| 2011/0094835 A1* | 4/2011 | Winkler | F16D 51/20 |
| | | | 188/78 |

* cited by examiner

METHODS AND DEVICES FOR UNIVERSAL BRAKING, SAFE START PROTECTION, AND OTHER MOTOR CONTROL FOR ALTERNATING CURRENT DEVICES

PRIORITY

This application claims the benefit of priority from U.S. application Ser. No. 15/972,131, now issued as U.S. Pat. No. 10,658,953, entitled "Methods and Devices for Universal Braking, Safe Start Protection, and Other Motor Control for Alternating Current Devices," filed May 5, 2018, and which claimed priority from U.S. Provisional Patent Application No. 62/503,096, entitled "Universal Plug and Play AC Induction Motor Brake and Safe Start Device", filed on May 8, 2017, each of which is incorporated by reference as if fully set forth herein.

BACKGROUND OF THE INVENTION

Field of Invention

Embodiments of the present disclosure relate generally to motor control and more specifically, to the safe deceleration and arrestment of moving machinery, prevention of accidental or unintentional device startup, and simple and universal installation.

Description of Related Art

Devices currently exist that decelerate and arrest rotating machinery, such as friction brakes and the like. This can be useful in situations in which the machinery includes a tool-equipped rotor (e.g., drill, saw, grinder) that, when rotating at high speed, can cause injury or destruction if movement is not ceased within a predetermined time frame. Furthermore, ceasing movement of a spinning tool can be difficult when the machine has a high rotational inertia, and such devices may be difficult to install and require frequent replacement parts. In addition, mechanical braking devices often require custom installation for each machine, which can prove costly.

Furthermore, devices currently exist that mitigate the danger in scenarios in which a machine with spinning parts can be unintentionally activated, or can begin operating without notice to people within the operational area of the machine. However, these devices may not include operational modes to allow for safe usage. Clearly, what is needed in the art is a low-maintenance, easy-to-install system that allows for safer operation of rotating machinery.

SUMMARY OF THE INVENTION

Disclosed herein are embodiments that allow for safe and effective deceleration and arrestment of dangerous user devices with high rotational inertia that continue spinning long after the user device has been powered down, such user devices include but are not limited to: band saws, table saws, disc sanders, drum sanders, grinders and other rotating or reciprocating machinery.

Embodiments described herein allow for active arrestment of rotation of a user device in cases in which an emergency stop is required. Embodiments described herein allow for a brake activation means to be integrated (in whole or in part) with a designated emergency stop feature.

Embodiments described herein decelerate and arrest the rotation of user devices equipped with AC induction motors, cause low impact on motor performance and lifetime, limit the need for replacement parts and/or maintenance, and prevent unwarranted or unintentional activation of AC induction motors.

Embodiments described herein allow for easy installation with little or no additional wiring or parts. In some instances, embodiments described herein can be installed merely by plugging in a user device into a female receptacle connected to embodiments described herein, and then plugging the male receptacle of embodiments described herein into a power outlet.

Embodiments described herein describe a device that allows for safer activation of a user device. Embodiments described herein integrate a DC injection brake for a user device equipped with an AC induction motor. Some simplified embodiments allow for little or no active sensing, solid state or complex digital control circuitry to sense the state of a user device power state or AC motor rotational state.

Embodiments described herein allow for simple and easy calibration of a DC injection brake by a user in order to provide the appropriate braking torque values for a user's AC induction motor-equipped device. Embodiments described herein may auto-calibrate without the need for user input as described herein. Furthermore, embodiments described herein may prevent or reduce overload, overheating, excessive wear, or decreased lifespan/meantime to failure, of a user device.

DETAILED DESCRIPTION

Generality of Invention

This application should be read in the most general possible form. This includes, without limitation, the following:

References to specific techniques include alternative and more general techniques, especially when discussing aspects of the invention, or how the embodiment might be made or used.

References to "preferred" techniques generally mean that the inventor contemplates using those techniques, and thinks those techniques are best for the intended application. This does not exclude other techniques for the invention, and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

Furthermore, the invention is in no way limited to the specifics of any particular embodiments and examples disclosed herein. Many other variations are possible which remain within the content, scope and spirit of the invention, and these variations would become clear to those skilled in the art after perusal of this application.

Glossary

In some embodiments, the term "safe start device" (and similar terms and phrases) may indicate embodiments that prevent the unintentional startup of a user device, (by way of example and not limitation, during an interruption of power) for the purpose of user and operator safety.

The term "AC induction motor-equipped user device", "user device", and similar terms and phrases, may generally indicate a user device that contains an integrated AC induction motor. Such devices include but are not limited to band saws, table saws, disc sanders, drum sanders, grinders and other fabrication equipment, and rotating or reciprocating machinery.

The term "Access Control" may refer to control circuitry which users can use to restrict unintended access to the user device and embodiments described herein. By way of example and not limitation, embodiments described herein may prevent a user device from being used by an unauthorized user (e.g. a digital or physical key).

The term "cloud," or "cloud computing" may refer to shared pools of computer system resources or a human machine interface (HMI) accessible through the Internet. These resources may be modular, or redundant, may take the form of software as a service (SaaS). Despite the possibility that the location and/or deployment method of these resources may be unknown or determined by a third party, the resources themselves are still accessible to embodiments described herein.

The abbreviations "A," "V," "AC," and "DC," as used herein are equivalent to, respectively, amps, volts, alternating current, direct current. Any other abbreviations used herein are intended to reflect standard abbreviations used in the electrical arts.

The terms rest (noun), arrest (verb), arresting, arrestment (noun describing process) may refer to the cessation of motion. As used herein, cessation of motion may refer to the complete deceleration of a spinning object (e.g., the rotor of an AC induction motor).

The terms "effect", "with the effect of" (and similar terms and phrases) generally indicate any consequence, whether assured, probable, or merely possible, of a stated arrangement, cause, method, or technique, without any implication that an effect or a connection between cause and effect are intentional or purposive.

The term "relatively" (and similar terms and phrases) generally indicates any relationship in which a comparison is possible, including without limitation "relatively less", "relatively more", and the like. In the context of the invention, where a measure or value is indicated to have a relationship "relatively", that relationship need not be precise, need not be well-defined, need not be by comparison with any particular or specific other measure or value. For example and without limitation, in cases in which a measure or value is "relatively increased" or "relatively more", that comparison need not be with respect to any known measure or value, but might be with respect to a measure or value held by that measurement or value at another place or time.

The term "substantially" (and similar terms and phrases) generally indicates any case or circumstance in which a determination, measure, value, or otherwise, is equal, equivalent, nearly equal, nearly equivalent, or approximately, what the measure or value is recited. The terms "substantially all" and "substantially none" (and similar terms and phrases) generally indicate any case or circumstance in which all but a relatively minor amount or number (for "substantially all") or none but a relatively minor amount or number (for "substantially none") have the stated property. The terms "substantial effect" (and similar terms and phrases) generally indicate any case or circumstance in which an effect might be detected or determined.

The terms "this application", "this description" (and similar terms and phrases) generally indicate any material shown or suggested by any portions of this application, individually or collectively, and include all reasonable conclusions that might be drawn by those skilled in the art when this application is reviewed, even if those conclusions would not have been apparent at the time this application is originally filed.

FIG. 1

Figure 1:
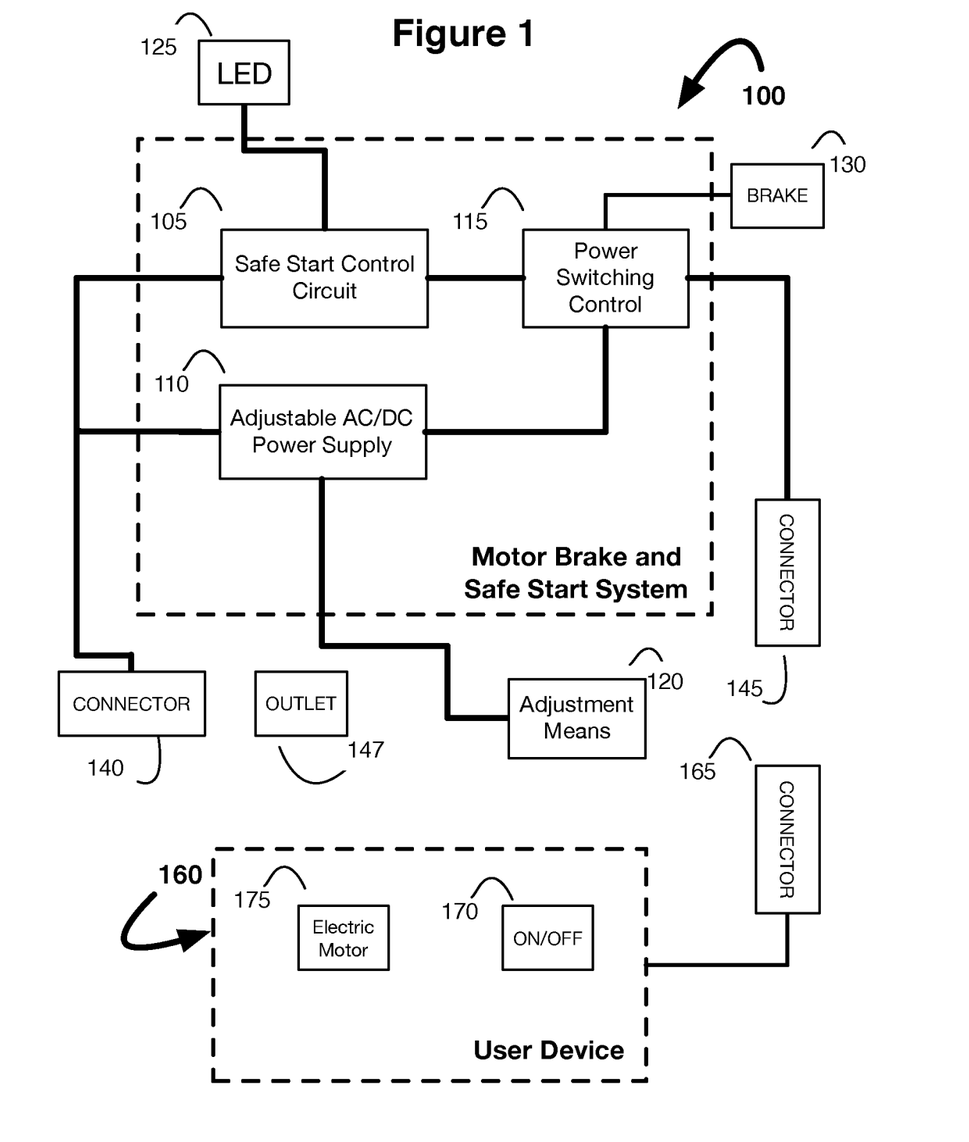
FIG. 1 illustrates a motor brake and safe start system connected to a user device, according to embodiments described herein.

FIG. 1 illustrates a motor brake and safe start system connected to a user device, according to one embodiment. FIG. 1 is a high-level overview of embodiment as described herein. FIG. 1 includes smart braking system 100 and user device 160, as delineated by dashed-line enclosed boxes.

Motor Brake and Safe Start System (Smart Braking System) 100

Motor brake and safe start system (referred to herein as "smart braking system 100") includes safe start control circuit 105, adjustable power supply 110, power switching control 115, braking torque adjustment means 120, operation status indicator 125, brake activation means 130, electrical connection 145 and electrical connection 140.

In some embodiments, safe start control circuit 105, adjustable power supply 110, and/or power switching control 115 may assist in managing different modes provided by embodiments described herein, including one or more of the following, but not limited to: braking mode, safe mode, standby mode, motoring mode (normal operation), reset mode as well as any modes as described herein. In one embodiment, power switching control 115 switches supplied electrical power from one source (e.g., AC mains) to a second source. In further embodiments, this second source is electrical power received from one or more of: safe start control circuit 105, adjustable power supply 110, or any other circuit element as described herein.

In some embodiments, adjustable power supply 110 converts AC electricity (e.g., AC mains power, 110 VAC, or any known AC electricity) into DC electricity (e.g., full-wave rectified DC, half-wave rectified DC, or any known DC electricity).

In some embodiments, braking torque adjustment means 120 may take the form of a turnable dial, "knob-style," "trimmer" potentiometer (i.e., "trim-pot" or "turn-pot") or variable resistor, but any and all means of adjusting an electrical signal are contemplated by the inventor, including but not limited to: physical inputs, software apps, microcontroller outputs, mobile device apps, control signals sent by an HMI or cloud server.

In some embodiments, operational status indicator 125 displays the status of embodiments described herein. By way of example and not limitation, statuses include operation modes as described herein (e.g., braking, motoring, reset, safety and standby modes). While operation status indicator 125 takes the form of an LED as pictured in FIG. 1, the inventor contemplates the usage of any and all informative displays, by way of example and not limitation: lights, sounds, A/V displays LED displays, televisions, HMI displays, desktop computer alerts, mobile app notifications, etc.

In some embodiments, brake activation means 130 may take the form of a press button-style electrical contact, but any and all means of activating an electrical signal is contemplated by the inventor, including but not limited to: physical inputs, software apps, mobile device apps, control signals sent by an HMI or cloud server.

In some embodiments, electrical connection 145 may be a female receptacle (grounded or ungrounded), electrical connection 140 may be a male plug (grounded or ungrounded), and electrical connection 140 may receive electricity from wall socket 147, or any source of electricity known in the art.

In some embodiments, electrical connections 140 and 145 may take the form of US standard 15 A, 110V, single-phase AC electrical connectors, but any and all forms of electrical connections with various compatibilities as required by regional standards are contemplated by the inventor, including but not limited to: 220 volt single-phase AC, or AC current provided by an inverter coupled to a battery (e.g., as in an electric vehicle).

In further embodiments, electrical connection 140 is connected to one or more of adjustable power supply 110, safe start control circuit 105, or any other circuit element as described herein.

User Device 160

User device 160 includes electrical connection 165, user device power switch 170, and AC-induction motor 175.

In some embodiments, electrical connection 145 may be attached to user device electrical connection 165. In these embodiments, smart braking system 100 supplies various types of electrical power to user device 160 as described herein. In further embodiments, electrical connection 165 may be a male plug (grounded or ungrounded), and electrical connection 140 may receive electricity from wall socket 147, or any source of electricity known in the art. In further embodiments, electrical connections 140 and 145 may take the form of US standard 15 A, 110V, single-phase AC electrical connectors, but any and all forms of electrical connections with various compatibilities as required by regional standards are contemplated by the inventor, including but not limited to: 220 volt single-phase or multi-phase AC, or AC current provided by an inverter supplied by a battery (e.g., as in an electric vehicle).

In another embodiment, electrical connectors 140, 145, 165 and any electrical connectors mentioned herein may include a physically-locking plug enclosure to prevent unplugging of embodiments described herein from user device 160. In a further embodiment, this enclosure may encapsulate male and female electrical connectors mentioned herein.

In some embodiments, user device 160 may contain or be attached to an AC induction motor, upon which embodiments described herein will operate (e.g., supply various types of electrical power). By way of example and not limitation, user device 160 may be a hand-held tool such as a power saw, impact hammer, etc., or a table- or floor-mounted tool such as a band saw, lathes, etc., or sizable units such as CNC mills, laser or plasma cutters, etc. Embodiments described herein may be used to decelerate and/or arrest AC motors of any size, from small, high-speed AC motors up to and including vehicle drivetrains (e.g., electric cars, passenger/freight train drives, passenger/freight ship/submarine drives, airborne vehicles such as airplane/helicopter/drone drives, etc.). Embodiments described herein are not limited to these devices; indeed embodiments described herein may be used with any AC induction motor-enabled device, and the inventor contemplates all such devices.

In some embodiments, access control methods may be implemented to prevent unauthorized use of embodiments described herein. For example, an RFID-enabled tag (not pictured) may be used in conjunction with an RFID reader (not pictured) connected to embodiments described herein in order to confirm that an authorized user is attempting to access embodiments described herein.

Modularity/Integrability of Embodiments Described Herein

While FIG. 1 displays smart braking system 100 and user device 160 as separate entities with electrical plugs (by way of example and not limitation connections 140, 145 and 165), those skilled in the art will understand that any and all electrical connections, including any electrical connections as described herein, to be merely descriptive and exemplary. More specifically, those of skill in the art will realize that any and all electrical connectors or connections as described herein can be simplified, thus allowing for integration of embodiments described herein with or within a user device. The inventor contemplates that embodiments described herein may be integrated directly into, e.g., a power tool, table-mounted tool, or any AC induction motor-enabled device mentioned herein and/or as known in the art. By way of example and not limitation, smart braking system 100 may be miniaturized and integrated into the handle of a rotary saw, or integrated into a junction box supplying power to a large AC motor (e.g., mill, lathe, etc.).

In contrast, embodiments described herein may be a separate, connectable module as shown in FIG. 1, including detachable plugs. In other words, embodiments described herein may be modular, and thus may be detached from a user device and moved to another user device. In one embodiment, smart braking system 100 may be 'unplugged' from a user device 160 and connected to another user device 160.

Output Current/Voltage Adjustments to AC Induction Motors

Embodiments described herein allow for effective DC injection to, and thus braking of, an AC induction motor without the need for active sensing, solid state or digital control circuitry to monitor or otherwise sense the state of the user device (e.g., user device power switch 170) or the current operational state of the user device AC induction motor (e.g., AC induction motor 175).

While some embodiments described herein do not require adjustments or sensing, the inventor contemplates embodiments that allow for adjustments of embodiments outputs to match the characteristics of a connected user device.

Embodiments described herein (by way of example and not limitation, smart braking system 100) may be adjusted by a user to better service a user device 160, by way of example and not limitation, smart braking system 100 may be tuned or programmed to supply a current/voltage combination (e.g., DC-injection) that comports with a currently-connected user device 160. In this embodiment, controls described herein, by way of example and not limitation, include braking torque adjustment means 120 which may be used to adjust the output of embodiments described herein to better service various user devices.

In some embodiments, smart braking system 100 may, by way of example and not limitation, also include DC waveform adjustments (full-wave rectified, half-wave rectified, high frequency switching, magnitude, frequency, etc.) in order to better service various user devices.

In some embodiments, smart braking system 100 may, by way of example and not limitation, also include adjustment for the period of time in which braking torque is being applied, as would be required for a single-press entry into the braking mode of operation. Such user adjustment (not pictured) may take the form of a turnable dial, "knob-style," "trimmer" potentiometer (i.e., "trim-pot" or "turn-pot") or variable resistor, but any and all means of adjusting an electrical signal are contemplated by the inventor, including but not limited to: physical inputs, software apps, microcontroller outputs, mobile device apps, control signals sent by an HMI or cloud server.

Embodiments described herein (by way of example and not limitation, smart braking system 100) may be computer-programmed with multiple current/voltage combinations to allow for quick-selection (e.g., by a user/computer) of pre-determined output settings to match smart braking system 100 output to a user device 160. By way of example and not limitation, pre-determined output settings may be stored as computer instructions (e.g., software/firmware) in memory (not pictured) (e.g., local/remote EEPROM, RAM, flash memory/hard drive/solid state drive, on the Internet or in the Cloud).

Embodiments described herein (by way of example and not limitation, smart braking system 100) may include an auto-detect feature (not pictured) that allows for detection by embodiments described herein (by way of example and not limitation, smart braking system 100) of a user device. In this manner, smart braking system 100 may automatically determine the input requirements for DC injection or other current/voltage combinations that are distinct and appropriate for an individual or range or AC induction motors, executed with reduced or no action by a user. Determination or reception of the specifications of a connected AC induction motor may be communicated through known wired or wireless data transfer means, by way of example and not limitation, USB, Bluetooth, Ethernet, RS-232, WiFi (2.4 GHz, 5 GHz), WiGig, (60 GHz), analog motor classification, etc. In one embodiment, an AC induction motor connected to a smart braking system 100 may send information to the smart braking system 100 by the above means, thus allowing smart braking system 100 to automatically adjust an output to a current/voltage combination appropriate for that AC induction motor. In another embodiment, the smart braking system 100 may contain voltage and current sensing means by which to characterize the impedance of the motor through an automatic test sequence and without input from a user, thereby automatically detecting optimal braking torque and delivering an optimized current/voltage combination appropriate for that AC induction motor.

Embodiments described herein (by way of example and not limitation, smart braking system 100) may receive and/or store information about a connected AC induction motor or user device through an interconnected network of devices, including but not limited to, multiple implementations of smart braking system 100, sensors, HMIs, computers, entities connected to the Internet (e.g., "Internet of Things"/IoT) or throughout the Cloud. By way of example and not limitation, access control, machine run time and system notifications may be enabled using the Cloud. In one embodiment, access to embodiments described herein may be restricted to authorized users (who log into e.g., a user's mobile device linked to a cloud account associated with embodiments described herein). In a second embodiment, operation time of embodiments described herein may be displayed on e.g., a user's mobile device. In a third embodiment, system information pertaining to embodiments described herein may be sent as notifications that are populated on a user's mobile device. In another embodiment, multiple instances of embodiments described herein may be linked to each other and share data as described herein with each other as well as other entities (e.g., HMIs, sensors used in factory automation, mobile devices owned by other authorized users who have cloud accounts associated with embodiments described herein) in an IoT environment. In another embodiment, user device information may be used to advise users on compliance or generate automatic reporting such as would be the case in federally-mandated fabrication and maintenance facilities.

Furthermore, while any element in FIG. 1 or elsewhere as described herein (by way of example and not limitation, braking torque adjustment means 120 or operation status indicator 125) may be illustrated as separate or exterior to smart braking system 100, these elements may be integrated in any manner with any other embodiments as described herein. By way of example and not limitation, braking torque adjustment means 120 may be (1) mounted directly on smart braking system 100; (2) mounted on user device 160; or (3) integrated into a wall panel or Human Machine Interface (HMI) used to control large AC induction motors (e.g., on an assembly line).

In addition, those skilled in the art will understand that, if electrical power supply and load requirements are met, there is virtually no limitation on the number or type of user devices connected to a single unit of embodiments described herein. While FIG. 1 displays one example of a user device 160, those skilled in the art will appreciate that embodiments described herein may supply electricity (by way of example and not limitation, in the form of DC-injection) to multiple AC induction motors of varying size and type. In one embodiment, the inventor contemplates including multiple outputs from smart braking system 100. In a further embodiment, embodiments described herein may include multiple outputs may supply DC-injection or other current/voltage types that are tailored to AC induction motors. This tailoring may be chosen to cause by way of example and not limitation, enhanced deceleration or arrestment, reduced wear or increased performance of the AC induction motor.

An alternative embodiment contemplated by the inventor is for embodiments described herein to be placed within the user's device as a universal module, supplied by the original equipment manufacturer of the user device. In this embodiment, embodiments described herein may be electrically situated between user device power switch 170 and AC-induction motor 175 and/or directly integrated into a user device. In this manner, control electronics that may be required for operation of embodiments described herein may be simplified. Further in this embodiment, embodiments described herein may automatically actuate user device power switch 170, as well as automatically apply braking torque when the user power switch 170 is manually actuated. Further in this embodiment, applied braking torque can be timed to achieve adequate rotor deceleration/arrestment. In additional embodiment, an active sensor may be used to ensure complete AC induction motor rotor arrestment has occurred. The inventor contemplates any and all sensors capable of this action, by way of example and not limitation, rotation, proximity, laser, fiber optic, vibrational sensors, accelerometers and any sensors known in the art.

In another embodiment, a package including some or all standard parts associated with embodiments described herein may be provided as a DIY kit for users to self-install a custom or permanent version of embodiments described herein.

In another embodiment, an embedded machine switch control device may be included to effectively override the user device power switch 170 to simplify control procedures provided herein.

In some embodiments throughout the disclosure, embodiments described herein may be intended to remain connected to a user device (by way of example and not limitation, supplying AC and/or DC power as described herein from embodiments described herein to the user device) in order for embodiments described herein to operate as described herein.

The above illustration provides many different embodiments for implementing different features of the invention. Specific embodiments of components and processes are described to help clarify the invention. These are, of course, merely embodiments and are not intended to limit the invention from that described in the claims.

Figure 2A:
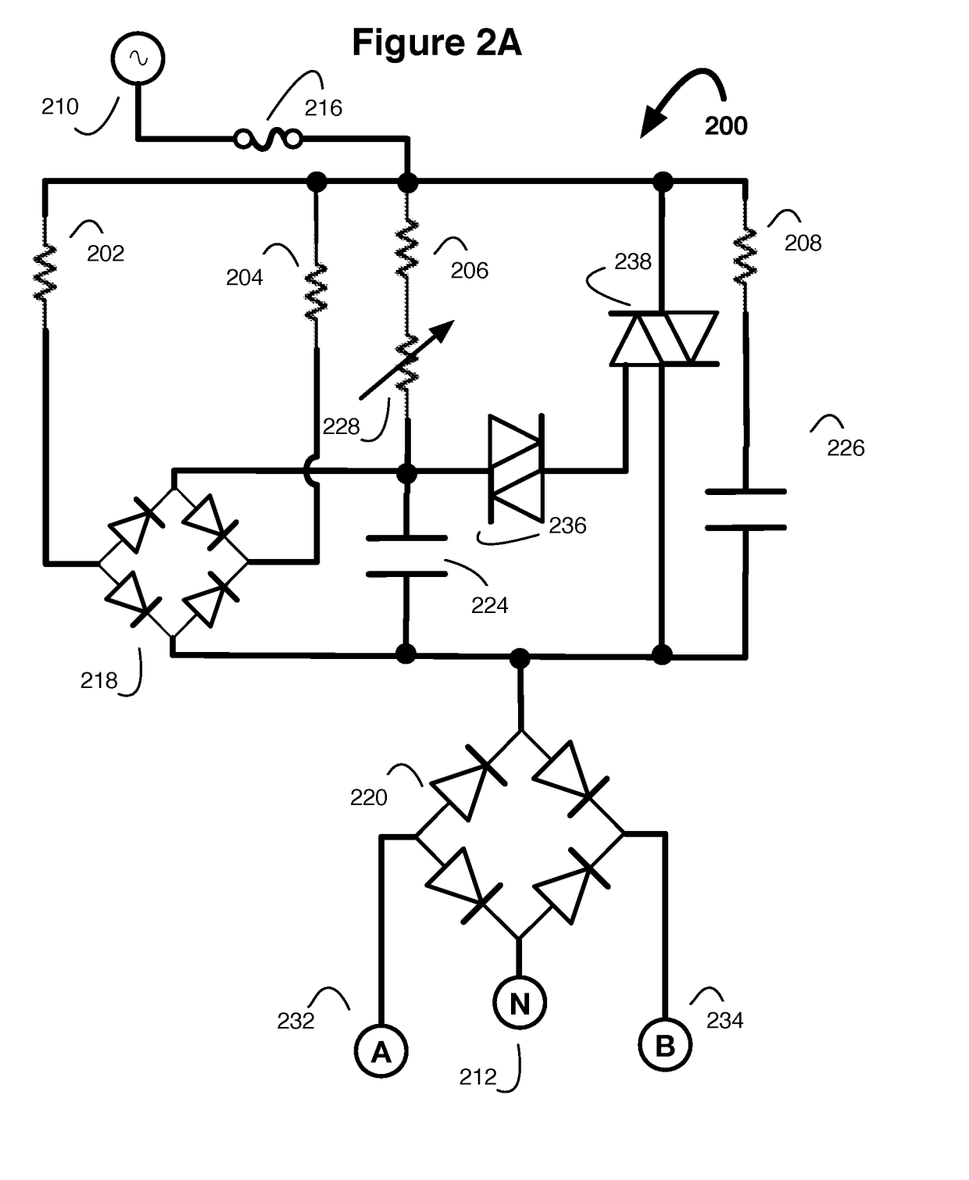
FIG. 2A illustrates a circuit schematic, according to embodiments described herein.
Figure 2B:
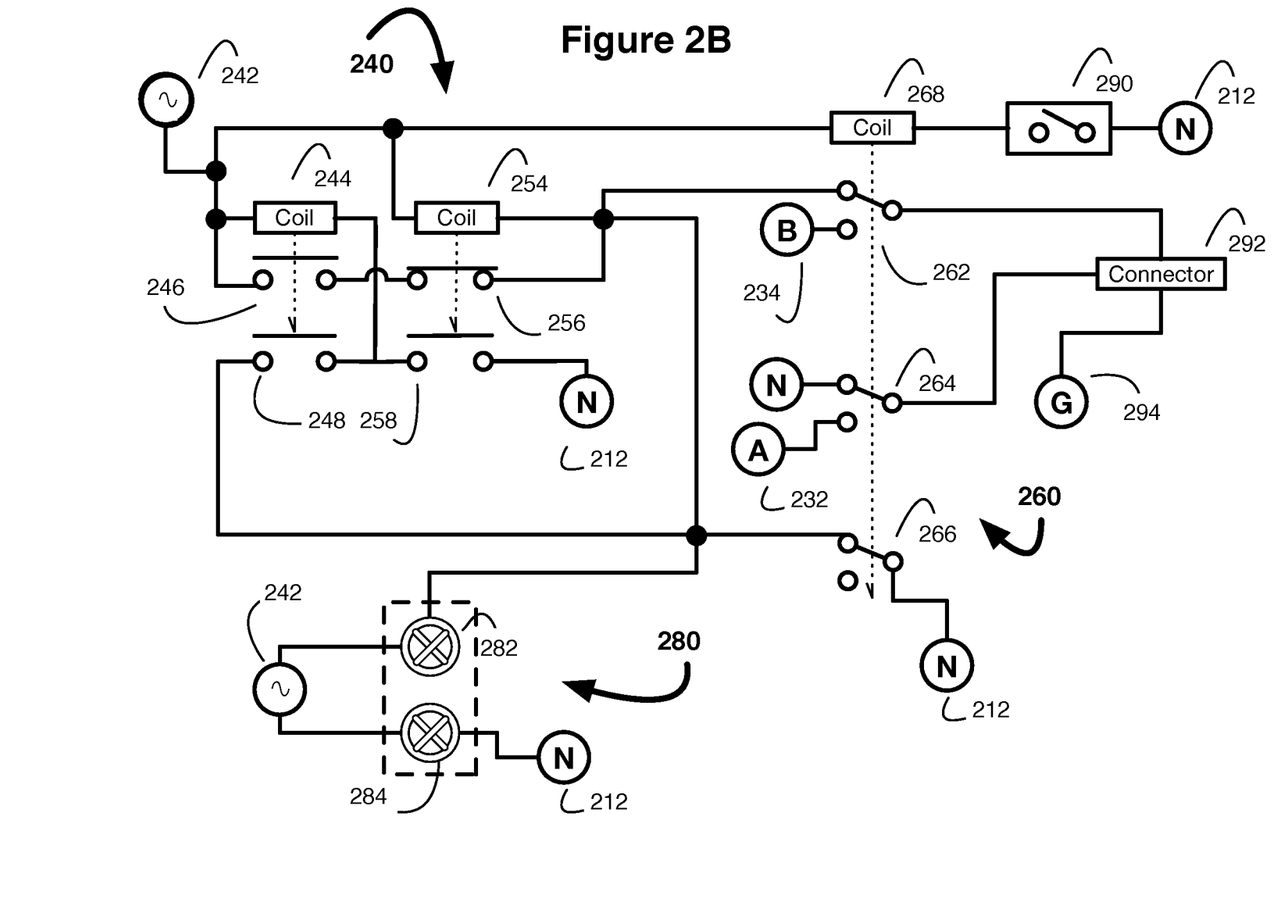
FIG. 2B illustrates a circuit schematic, according to embodiments described herein.

FIGS. 2A and 2B

FIGS. 2A and 2B illustrate a circuit schematic, according to one embodiment. FIG. 2A illustrates adjustable power supply 200, which includes resistors 202, 204, 206, and 208, hot supply 210, neutral terminal 212, optional circuit protection device 216, diode bridges 218 and 220, capacitors 224 and 226, variable resistor 228, contact A 232 and contact B 234, DIAC 236, and TRIAC 238.

In one embodiment, hot supply 210 may be AC mains power, and neutral terminal 212 may be a return current path. In one embodiment, optional circuit protection device 216 may protect embodiments described herein from current/voltage overload, and may be by way of example and not limitation, a fuse or circuit breaker.

In one embodiment, capacitor 224, resistor 206, variable resistor 228, and DIAC 236 may have their values chosen to set the firing angle range of TRIAC 238. In one embodiment, TRIAC 238 may control the flow of current from the hot supply 210 to the bridge rectifier 220. Those skilled in the art will realize that TRIAC 238 controls the relative magnitude of the DC voltage presented across terminal B 234 and terminal A 232, thereby regulating the braking torque imposed onto a user device. In further embodiments, diode bridge 218, in conjunction with resistors 202 and 204, may remove residual charge from capacitor 224 as the line voltage switches polarity. In one embodiment, this may ensure a consistent starting voltage for capacitor 224 on each half cycle of the AC mains power, may prevent 'snap-on' behavior of the adjustable power supply, and may allow for improved low-power performance of the adjustable power supply.

In one embodiment, diode bridge 220 may full-wave rectify an output. In a further embodiment, adjustable power supply 200 forms a full wave rectified AC chopper circuit capable of converting AC power into DC power of adjustable magnitude.

In one embodiment, variable resistor 228 may be used by a user to adjust the braking torque output by embodiments described herein. In a further embodiment, a user may adjust variable resistor 228 with, by way of example and not limitation, an adjustment means such as a turnable dial, "knob-style," "trimmer" potentiometer (i.e., "trim-pot" or "turn-pot"), or any adjustment means as described herein. In a further embodiment, variable resistor 228, in conjunction with resistor 206, capacitor 224, and DIAC 236 may have a value chosen to set a minimum and maximum range of output DC voltage, which, in some embodiments, may be used as DC injection current fed into an AC induction motor. In this manner, braking torque may be adjusted. Furthermore, resistor 206 may have a resistance to set the minimum and maximum range of the power circuit.

In one embodiment, capacitor 226 forms an RC snubber circuit with resistor 208, wherein the capacitance and resistance may be chosen to partially or completely dissipate inductive voltage spikes within embodiments described herein.

FIG. 2B

FIG. 2B illustrates safe start control circuit 240, power switching control 260, indicator lamps 280, brake activation means 290.

Safe Start Control Circuit 240

In one embodiment, safe start control circuit 240 receives power from hot supply 242, which may be AC mains power. In one embodiment, safe start control circuit 240 includes relay 244, which contains a first normally open contactor 246 and a second normally open contactor 248. In a further embodiment, contactor 246 and contactor 248 may be simultaneously operated by excitation of a single coil associated with relay 244, as illustrated by a symbolic dashed line and downward pointing half arrow.

In a further embodiment, safe start control circuit 240 includes relay 254, which contains normally closed contactor 256 and normally open contactor 258. In a further embodiment, contactor 256 and contactor 258 may be simultaneously operated by excitation of a single coil associated with relay 254, as illustrated by a symbolic dashed line and downward pointing half arrow.

In a further embodiment, a current path to connector 292 may be formed from the hot supply 242 through contactor 246, contactor 256, and switch 262. In a further embodiment, as will be realized by those skilled in the art, the coil of relay 244 may be latched to neutral, thereby exciting relay 244, through contactor 258 and/or contactor 248 and switch 266.

Power Switching Control 260

In one embodiment, power switching control 260 includes switches 262, 264 and 266, as well as relay 268. In one embodiment, switches 262, 264 and/or 266 may take the form of double throw contactors, SPDT contactors, or any other electrical switching means known in the art. In a further embodiment, switches 262, 264 and 266 are simultaneously or mutually operated by excitation of a single coil associated with relay 268, as illustrated by a symbolic dashed line and downward pointing half arrow.

In an another embodiment, the common terminal of brake activation means 290 is connected to neutral terminal 212 and the normally-open terminal of switch 290 is connected to the coil of relay 268. In a further embodiment, the coil of relay 268 may also be connected to hot supply 242.

In a further embodiment, the common terminal of switch 262 may be connected to connector 292, the normally-open terminal of switch 262 may be connected to contact B 234, and the normally-closed terminal of switch 262 may be connected to contactor 256, the coil of relay 254, and indicator 282.

In a further embodiment, the common terminal of switch 264 may be connected to connector 292, the normally-open terminal of switch 264 may be connected to contact A 232, and the normally-closed terminal of switch 264 may be connected to neutral terminal 212.

In a further embodiment, the common terminal of switch 266 may be connected to neutral terminal 212 and the normally-closed terminal of switch 266 may be connected to contactor 248. In one embodiment, switches 262 and 264 may be connected to electrical connection 292. In one embodiment, electrical connector 292 may be a female electrical receptacle that allows a user device to be connected to electrical connection 292. In a further embodiment, electrical connector 292 has at least one connection to ground terminal 294. In further embodiments, electrical connection 292 may take the form of a US standard 15 A, 110V, single-phase AC electrical connector, but any and all forms of electrical connections with various compatibilities as required by regional standards are contemplated by the inventor, including but not limited to: four or more pole connectors, 220 volt single-phase or multi-phase AC, or AC current provided by an inverter coupled to a battery (e.g., as in an electric vehicle).

Indicators 280

In one embodiment, indicators 280 includes indicator 282 and indicator 284. Indicator 282 may be connected to hot supply 242 as well as the coil of relay 254, contactor 256, and the normally-closed terminal of switch 262. Indicator 284 is connected to hot supply 242 as well as neutral terminal 212.

In one embodiment, indicators 280 may display statuses of embodiments described herein. While indicator 282 and indicator 284 are illustrated as LEDs, the inventor contemplates all methods of status indication, including those described herein and as known in the art. In one embodiment, indicator 284 may illuminate to indicate that AC power has been provided to embodiments described herein. In one embodiment, indicator 282 may illuminate to indicate that embodiments described herein are in safe mode 320 and that a user device switch is powered on and may need to be reset.

In one embodiment, brake activation means 290 may include a switch to allow a user to control a DC injection brake and supply DC power to an attached AC induction motor-equipped user device, as described herein.

Safe Mode Circuit Path Execution

Embodiments follow that describe various operational modes of embodiments described herein. If, during initial startup, the user device is switched to a "power on" state, embodiments described herein may enter a first operational state: safe mode. In one embodiment, safe mode may provide protection against an unintended powering on of an attached user device when power is restored to the user device (after, e.g., a power interruption). In a further embodiment, safe mode is actuated by the neutral terminal of the coil of relay 254 being connected to neutral terminal 212 through switch 262, electrical connector 292, electrical connector 165, user device power switch 170, and the winding of user device AC induction motor. In one embodiment, relay 254 may have a coil impedance selected such that excitation of relay 254 can be maintained for a wide range of AC induction motor impedances.

In one embodiment, excitation of relay 254 opens contactor 256, which may thereby preemptively and materially disconnect a user device from the hot supply. Furthering this embodiment, relay 244 is simultaneously excited, by the closure of contactor 258. The excitation of relay 244 closes contactor 246, and thereby readies embodiments described herein by supplying AC power to the common terminal of contactor 256.

The excitation delays of relays described herein may be selected and coordinated to prevent a race condition where contactor 246 could close before contactor 256 could open. The excitation of relay 244 may also latch relay 244 through contactor 248, thereby releasing dependence of relay 244 on the state of relay 254. While in safe mode, indicator 282 many also connect to neutral terminal 212 to indicate safe mode status.

Reset Mode Circuit Path Execution

In one embodiment, if upon initial powering up of embodiments described herein, the user device is switched to a "power off" state, embodiments described herein may enter a second operational mode: reset mode. In one embodiment, reset mode alerts the user of the presence of a DC injection braking unit, and, in a further embodiment, may require the user to perform an initial arming sequence to return embodiments described herein to return to a normal operational state.

In a further embodiment, reset mode may be a default state in which relay 244 may remain unexcited, thereby keeping contactor 246 open, and may prevent the flow of some or all of power from hot supply 242. In an additional embodiment, embodiments described herein may be armed by forcing embodiments described herein into safe mode (as described herein) by turning the user device to an "on" state.

Standby Mode Circuit Path Execution

In one embodiment, if embodiments described herein are in safe mode (as described herein) embodiments described herein can be put into third operational state: standby mode. In this embodiment, embodiments described herein can be put into standby mode by switching the user device to a "power off" state. In a further embodiment, this action may interrupt the neutral path of relay 254, which may thereby de-excite relay 254 and may close contactor 256 and open contactor 258, which may latch relay 244 through contactor 258 to neutral terminal 212, which may connect electrical connection 292 to hot supply 242 for normal operation of a user device.

Motoring Mode Circuit Path Execution

In one embodiment, while embodiments described herein are in standby mode (as described herein), a user device may be operated normally through the use of the power switch connected to the user device, putting embodiments described herein in a fourth operational state: motoring mode. Thus, in this embodiment, the AC induction motor connected to the user device may operate normally (as intended) when embodiments described herein are in motoring mode. Further in this embodiment, with brake activation means 290 is actuated, embodiments described herein may transition from motoring mode to braking mode, whereby a braking torque can be applied (as described herein).

Braking Mode Circuit Path Execution

While in motoring mode, reset mode, or standby mode, embodiments described herein may enter a fifth operational state: braking mode. In one embodiment, braking mode may engaged when brake activation means 290 is actuated. In this manner, the operation of brake control 290 may function to decelerate or arrest the rotor of a user device connected to electrical connection 292.

In one embodiment, the activation of brake control 290 may excite relay 268, which may thereby switch the common of contactors 262 and 264 to contact B and A, respectively, which, in one embodiment, may be connected to DC from adjustable power supply 200. Further in this embodiment, the activation of brake control 290 may interrupt the latching circuit of relay 244 through contactor 266, thereby preventing the simultaneous connection of AC mains 242 and the adjustable power supply 200 to connection 292. Further in this embodiment, the subsequent release of brake control 290, may return embodiments described herein to safe mode (as described herein).

In one embodiment, when in braking mode, embodiments described herein may introduce a regulated DC voltage into the AC induction motor of a user device, effectively utilizing DC injection to decelerate or arrest the rotor and attached tooling to the AC induction motor. During activation of brake activation means 290, DC power may be produced within adjustable power supply 200 and may be switched through contactors 262 and 264. Within adjustable power supply 200, AC power may be regulated through TRIAC 238 as part of a phase-controlled AC chopper circuit, which may then be rectified into chopped, full-wave rectified DC power. In a further embodiment, braking torque supplied by embodiments described herein may be calibrated through variable resistor 228 as described herein. In one embodiment, resistor 206 and variable resistor 228 have values selected to provide a braking torque range suitable for attached user devices and to prevent overload, overheating, excessive wear, or decreased lifespan/meantime to failure, of a user device. In an additional embodiment, variable resistor 228 are placed in a location accessible to the user.

While electromechanical devices (e.g., relays, switches, contactors, etc.) are pictured in FIG. 2B, those skilled in the art will appreciate that some or all of these electromechanical devices may be replaced with solid-state equivalents. By way of example and not limitation, switches may be replaced with other switching elements with voltage/current/performance specifications suitable for the application (e.g., tuned for or compatible with a specific or range of AC induction motors). Any and all solid state equivalents are contemplated by the inventor, including but not limited to: MOSFETs, SCRs, TRIACs, BJTs, and/or microcontroller-actuated switches. Those of skill in the art will appreciate that elements in FIGS. 2A and 2B may be executed using either a digital implementation (e.g., including a processor, memory and bus communication system, etc.), or an analog implementation (e.g., control circuitry).

By way of example and not limitation, a closed-loop integral current feedback may be used to regulate DC output current of smart braking systems as described herein to the user device. Furthering this embodiment, the inclusion of a current transformer, hall-effect sensor, or other proportional current-sensing device (not pictured) may be used to effectively transition the DC injection output of the smart braking system 100 from a voltage source to a current source, as will be realized by those skilled in the art. Furthering this embodiment, the control circuitry needed to accomplish this regulation can be achieved through analog circuitry or by digital means.

In an additional embodiment, the DC injection output current of smart braking systems as described herein may be ramped up to a final value. By way of example and not limitation, this ramped current output may be linear, logarithmic, or exponentially, starting at a magnitude substantially zero and ramping up to a final output value as described herein. Furthering this embodiment, the output current may also ramp down at the conclusion of the braking action, starting at the braking value and ramping down to substantially zero.

Some embodiments may be capable of receiving inputs as follows: 120 VAC with a continual current rating of 20 amps and a peak current rating of 35 amps. Some embodiments may be capable of producing outputs as follows: (1) 120 volts AC (by way of example and not limitation, in standby or motoring mode as described herein) with a current rating of 20 amps continuous and 35 amps peak; (2) 10-170 volts DC (by way of example and not limitation, braking mode, as described herein) with a braking current rating of 15 amps continuous and 25 amps peak; and, (3) 0 volts (reset or safe mode).

Some embodiments provide for safely starting (by way of example and not limitation, safe start or smart braking, as described herein), stopping (by way of example and not limitation, braking mode, as described herein), user devices with AC induction motors in the following ranges: (1) 110-220 VAC rating (2) DC motor impedances 0.3Ω, –10Ω, (3)¹⁄₁₆th horsepower to 1.75 horsepower single phase induction motors; (4) motor configurations of one or more of the following types: capacitor start, capacitor run, capacitor start capacitor run, and/or split winding.

The inventor contemplates that electrical components used and described herein may be of varying types, and those of skill in the art will appreciate that many electrical components may be interchangeable. By way of example and not limitation, a list of exemplary component parts is provided that may be used in some embodiments as described herein. This is list is not exhaustive, and is given in following table:

TABLE 2.1

| Element # | Description | Value | Part No. |
|---|---|---|---|
| 218 | Bridge Rectifier | 1 amp rated | ABS10A-13 |
| 224 | Metal Film Capacitor | 0.1 microfarad | MKS2F031001E00JA00 |
| 226 | Metal Film Capacitor | 0.1 microfarad | 104MKP275KD |
| 236 | DIAC | 32 V Trigger | SMDB3 |
| 206 | Resistor | 70 kiloohms | CR0805-FX-7152ELF |
| 208 | Resistor | 100 ohms | ERJ-1TYJ101U |
| 228 | Potentiometer | 100 kiloohms | 3309W-1-104 |
| 202 | R-US_R0805 | 33 kiloohms | ERJ-P06J303V |
| 204 | R-US_R0805 | 33 kiloohms | ERJ-P06J303V |
| 238 | High-Commutation TRIAC | 25 Amp | Q6025LH5TP |
| 244, 246, 248 | DPDT RELAY | DPDT RELAY | 782XBXCT-120A |
| 254, 256, 258 | DPDT RELAY | DPDT RELAY | 782XBXCT-120A |
| 268, 262, 264 | 3PDT RELAY | 3PDT RELAY | 783XCXM4L-120A |
| 216 | Circuit Breaker | 15 AMP | 4404.0102 |
| 220 | Bridge Rectifier | 35 amp rated | KBU3510-G |

FIG. 3

Figure 3:
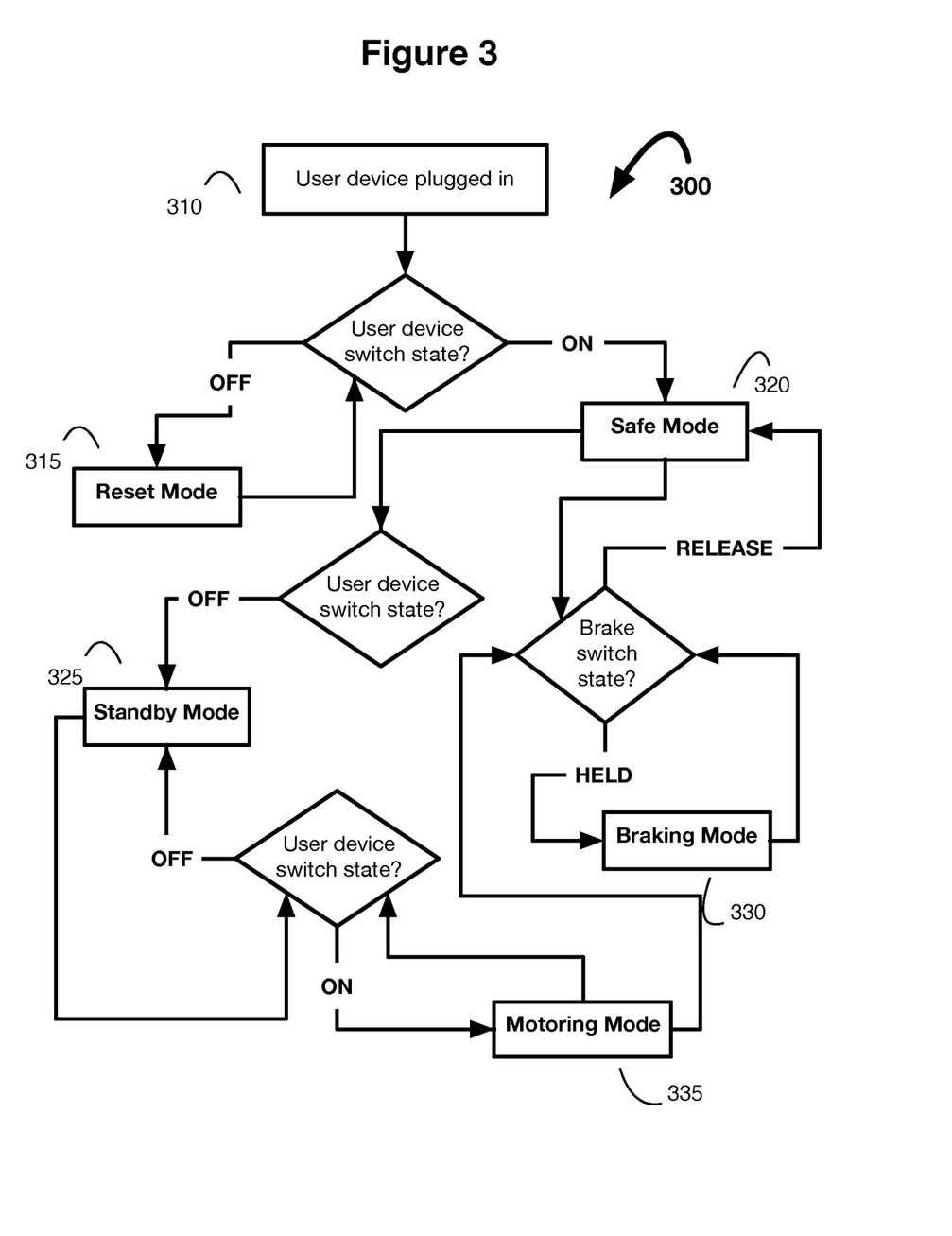
FIG. 3 illustrates a method for switching between operational states, according to embodiments described herein.

FIG. 3 illustrates a method for switching between operational states, according to embodiments described herein. Although the method steps are described in conjunction with FIGS. 1-3, persons skilled in the art will understand that any system configured to perform the method steps, even in a different order may fall within the scope of the present disclosure. Moreover, the steps in this method are illustrative only and do not necessarily need to be performed in the given order they are presented herein. In some embodiments, certain steps may be omitted completely.

The method 300 begins with step 310, in which a user device is initially supplied power. The method 300 diverges depending on the on/off state of the user device.

Reset Mode

If the user device is switched off, the method 300 proceeds to a step 315 in which begins a reset mode, as described herein. In one embodiment, reset mode may prevent user device operation in order to notify user of the existence of embodiments described herein and/or decelerates user device motor rotation. At this step 315, if no further action is taken, embodiments described herein may remain in reset mode and the method 300 ends. If the user device is switched on, the method 300 proceeds to a step 320, described below.

Safe Mode

Continuing from step 310 above, if the user device is switched on, the method 300 proceeds to a step 320 which begins a safe mode, as described herein. In one embodiment, safe mode prevents user device motor output and/or decelerates user device motor rotation. If no further action is taken, embodiments described herein may remain in safe mode and the method 300 ends.

If, however, in step 320, the user device is switched off, the method 300 proceeds to a step 325, wherein embodiments described herein may enter a standby mode. Alternatively, if the brake button is pressed and held, embodiments described herein may enter a braking mode as described herein and the method 300 proceeds to a step 330.

Standby Mode

At a step 325, user device output is in AC mode and user device motor rotation may be uninhibited by embodiments described herein. In one embodiment, user device motor rotation may be coasting or at rest. If no further action is taken, the method 300 ends. If the user device is switched back on, embodiments described herein may enter a motoring mode as described herein, and the method proceeds to a step 335.

Braking Mode

At a step 330, embodiments described herein output DC power to the user device. In one embodiment, the user device is an AC induction motor that, upon receiving DC power, will decelerate the user device motor rotation. In other words, embodiments described herein act as an electromagnetic brake since DC power will create a stationary magnetic field as opposed to the rotating magnetic field that occurs within AC induction motors. In this manner, embodiments described herein may safely and effectively decelerate the user device motor rotation rather than simply waiting for user device motor rotation to halt (based on e.g., AC motor internal friction, eddy currents, drag, etc.).

If no further action is taken, the method 300 ends. If the brake button is released, embodiments described herein may enter safe mode and the method returns to step 320.

Motoring Mode

At a step 335, the user device is in normal operation. In one embodiment, the user device is switched on, delivering nominal AC power to the user device and integral induction motor, causing motor rotation. If the brake button is pressed and held, embodiments described herein may enter braking mode as described herein, and the method 335 returns to step 330. If no further action is taken, the method 300 ends.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

I claim:

1. A circuit for a smart safety system for outfitting to a preexisting machine having rotatable components, electrical connections, and an AC motor, where the machine, without the smart safety system, is configured to operate such that upon supplying power to the AC motor and thereby rotating the rotatable components, inertia of the rotating rotatable components causes the rotating rotatable components to continue rotating after supply of the power to the AC motor is discontinued, the smart safety system being enclosed in an electrical enclosure, and the circuit for the smart safety system comprising:
    an electrical input connection to obtain power from a power source;
    an electrical output connection to provide power to the AC motor;
    an adjustable DC power supply to supply DC electricity to arrest motion of the AC motor;
    one or more electronic switching devices to regulate electricity output to the AC motor; and
    a controller to receive and process electrical signals,
    wherein the circuit has one more functional states including:
        a first state, activated via a first electrical signal, in which AC electricity is supplied to AC motor to allow normal operation of the AC motor, and
        a second state, activated via a second electrical signal, in which no electricity is supplied to the AC motor to prevent unintentional operation of the AC motor, and
    wherein the smart safety system is configured to be installed to the machine via the electrical connections of the machine without altering or contacting the rotating components.

2. The circuit of claim 1, wherein the AC motor is an integral part of an apparatus that is one of:
    a bench grinder,
    a pedestal grinder,
    a disc sander,
    a drum sander,
    a band saw,
    a table saw,
    a pipe threader,
    a metal-cutting saw,
    a wood-cutting saw, or
    an industrial machine containing the AC motor.

3. The circuit of claim 1, wherein the electrical input connection and the electrical output connection, respectively, are one of:
    a male plug,
    a female plug,
    a pigtail, or
    a terminal block.

4. The circuit of claim 1, wherein the first electrical signal and the second electrical signal, respectively, are initiated by at least one of:
    manual actuation of a switch,
    microcontroller outputs,
    software apps,
    mobile device apps,
    human machine interface or via cloud server interface,
    a response to detected user device state, or
    solid state logic outputs.

5. The circuit of claim 1, wherein the AC to DC power supply includes a power supply circuit that includes one or more of:
    a sub-controller to process and receive electrical signals,
    an electricity regulator to regulate the electricity output based on received electrical signals,
    a phase-controlled AC chopper circuit to regulate electricity output, a switching DC supply to regulate electricity output,
a pulse-width modulated semiconductor to regulate electricity output, and
a diode bridge to rectify electricity output.

6. The circuit of claim 1, wherein the circuit is configured to prevent unintentional startup of the AC motor after a power failure.

7. The circuit of claim 1, further comprising a thermal overload protection sub-circuit to protect the AC motor from overloads, the thermal overload protection sub-circuit including one or more of:
a current-based fusing element,
a thermal fusing element,
a magnetic circuit breaker,
a thermal circuit breaker,
a combination magnetic/thermal circuit breaker,
integral current feedback, or
a current-sensing element.

8. The circuit of claim 1, wherein the circuit regulates the electricity delivered to the AC motor based on electrical signals from one or more of:
a turnable dial,
a potentiometer,
integral current feedback,
the manual actuation of a switch,
microcontroller outputs,
software apps,
mobile device apps,
human machine interface or cloud server, or
solid state logic outputs.

9. The circuit of claim 1, wherein the first electrical signal and the second electrical signal are transmitted through a standardized electrical interface to allow simple interchangeability of electrical signal sources, the standardized electrical interface including one or more of:
a standardized connector,
a standardized pinout,
a standardized digital encoding, or
a standardized radio-frequency protocol.

10. The circuit of claim 1, wherein the circuit further comprises a sensing sub-circuit to sense a state of the user device to identify one or more of:
motor faults,
motor overload conditions,
motor speed,
motor binding conditions,
motor wear, and
user device wear.

11. A method to mitigate risk of injury to a human operator using a machine having rotatable components, electrical connections, and an AC motor, where the machine preexists as an operational assembly in a manner such that upon supplying power to the AC motor and thereby rotating the rotatable components, inertia of the rotating rotatable components causes the rotating rotatable components to continue rotating after supply of the power to the AC motor is discontinued, and the method to mitigate risk of injury comprising:
outfitting the machine with a safety system, the outfitting including connecting the safety system to the electrical connections without altering or contacting the rotating components, and the safety system including:
a power switching module configured to:
provide AC electricity to operate the AC motor,
provide DC electricity to arrest motion of the AC motor, and
provide no electricity to prevent unintentional operation of the AC motor, and
an input module configured to receive and process electrical inputs, the safety system being contained within an electrical enclosure;
operating the AC motor in response to electrical input signals received by the input module;
arresting the AC motor in response to electrical input signals received by the input module; and
preventing operation of the AC motor in response to electrical input signals received by the input module.

12. The method of claim 11, wherein the machine is one of:
a bench grinder,
a pedestal grinder,
a surface grinder,
a disc sander,
a drum sander,
a band saw,
a table saw,
a pipe threader,
a metal-cutting saw,
a wood-cutting saw,
a milling machine,
a lathe,
a flywheel-driven press, or
an industrial machine containing the AC motor.

13. The method of claim 11, wherein the electrical connections include an input connection and an output connection, wherein the input connection and the output connection, respectively, are one of:
a male plug,
a female plug,
a pigtail, or
a terminal block.

14. The method of claim 11, wherein the electrical input signals are initiated by at least one of:
manual actuation of a switch or a button,
microcontroller outputs,
software apps,
mobile device apps,
human machine interface or via cloud server interface,
a response to detected user device state, or
solid state logic outputs.

15. The method of claim 11, wherein the DC electricity is generated by a plurality of circuit elements formed into one or more of the following circuit topologies:
a phase-controlled AC chopper circuit,
a switching DC power supply to regulate electricity output,
a pulse-width modulated semiconductor or thyristor to regulate electricity output, and
a diode bridge to rectify electricity output.

16. The method of claim 11, wherein the power switching module is further configured such that prevention of the unintentional operation of the AC motor occurs after a power failure.

17. The method of claim 11, wherein the safety system further includes a thermal overload protection sub-circuit to protect the AC motor from overloads, the thermal overload protection sub-circuit including one or more of:
a current-based fusing element,
a thermal fusing element,
a magnetic circuit breaker,
a thermal circuit breaker,
a combination magnetic/thermal circuit breaker,
integral current feedback, or
a current-sensing element with threshold.

18. The method of claim 11, wherein the power switching module regulates the DC electricity delivered to the AC motor based on electrical signals from one or more of:

a turnable dial,
a potentiometer,
integral current feedback,
the manual actuation of a switch,
microcontroller outputs,
software apps,
mobile device apps,
human machine interface or cloud server, or
solid state logic outputs.

19. The method of claim 11, wherein the electrical input signals are transmitted through a standardized electrical interface to allow simple interchangeability of electrical signal sources, the standardized electrical interface including one or more of:
a standardized connector,
a standardized pinout,
a standardized digital encoding, or
a standardized radio-frequency protocol.

20. The method of claim 11, wherein the safety system further includes a sensing sub-circuit to sense a state of the machine to identify one or more of:
motor faults,
motor overload conditions,
motor speed,
motor binding conditions,
motor wear, and
user device wear.

\* \* \* \* \*